United States Patent
Detable et al.

(10) Patent No.: US 7,147,253 B2
(45) Date of Patent: Dec. 12, 2006

(54) QUICK-CONNECT COUPLING

(75) Inventors: Pascal Detable, Gievres (FR); Fabrice Prevot, Selles sur Cher (FR); Nicola Rigollet, Romorantin Lauthenay (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 0 days.

(21) Appl. No.: 10/333,949

(22) PCT Filed: Jul. 24, 2001

(86) PCT No.: PCT/FR01/02410

§ 371 (c)(1),
(2), (4) Date: Jan. 24, 2003

(87) PCT Pub. No.: WO02/08656

PCT Pub. Date: Jan. 31, 2002

(65) Prior Publication Data

US 2003/0173780 A1 Sep. 18, 2003

(30) Foreign Application Priority Data

Jul. 24, 2000 (FR) .................................. 00 09662

(51) Int. Cl.
*F16L 37/00* (2006.01)
(52) U.S. Cl. .................... 285/308; 285/39; 285/319; 285/321
(58) Field of Classification Search ............. 403/109.1, 403/109.2, 109.3, 288, 321, 325, 326, 327, 403/328, 329, DIG. 4, 315–317; 285/308 X, 285/317, 319 X, 321 X, 39 X
See application file for complete search history.

(56) References Cited

U.S. PATENT DOCUMENTS

| 5,366,259 | A | | 11/1994 | Hohmann et al. | |
|---|---|---|---|---|---|
| 5,536,047 | A | * | 7/1996 | Detable et al. | ......... 285/39 |
| 5,971,445 | A | | 10/1999 | Norkey | |

FOREIGN PATENT DOCUMENTS

| EP | 0 651 198 | 5/1995 |
|---|---|---|
| EP | 0 719 971 | 7/1996 |
| WO | WO 98 57061 A | 12/1998 |

OTHER PUBLICATIONS

Merriam-Webster's Collegiate Dictionary 2001, Merriam-Webster Inc., Tenth Edition, p. 794.*

* cited by examiner

*Primary Examiner*—Daniel P. Stodola
*Assistant Examiner*—Victor MacArthur
(74) *Attorney, Agent, or Firm*—Cabinet Beau De Lomenie

(57) ABSTRACT

A quick-connect coupling which includes a locking ring (20) disposed in an coupling body to co-operate with a catch surface on a tube fitted into the coupling. The ring is elastically deformable to go between an unlocking configuration and a locking configuration, in which at least one locking zone (30, 32) co-operates with the catch surface. To this end, the ring is provided with at least one unlocking bridge (22, 24) that protrudes through a slot in the body of the coupling. The ring is constituted by a strip that is plastically deformed to have at least the locking zone and the bridge. The ring forms a closed loop and has two ends (20A, 20B) which overlap, and which are suitable for sliding one over the other while the ring is being elastically deformed.

6 Claims, 5 Drawing Sheets

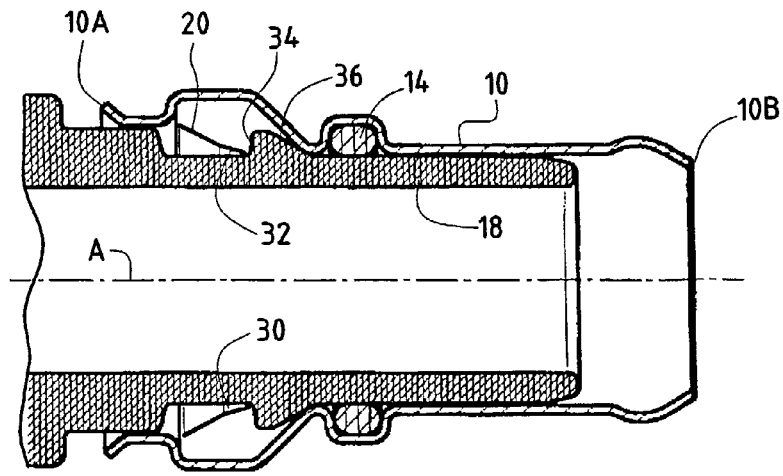
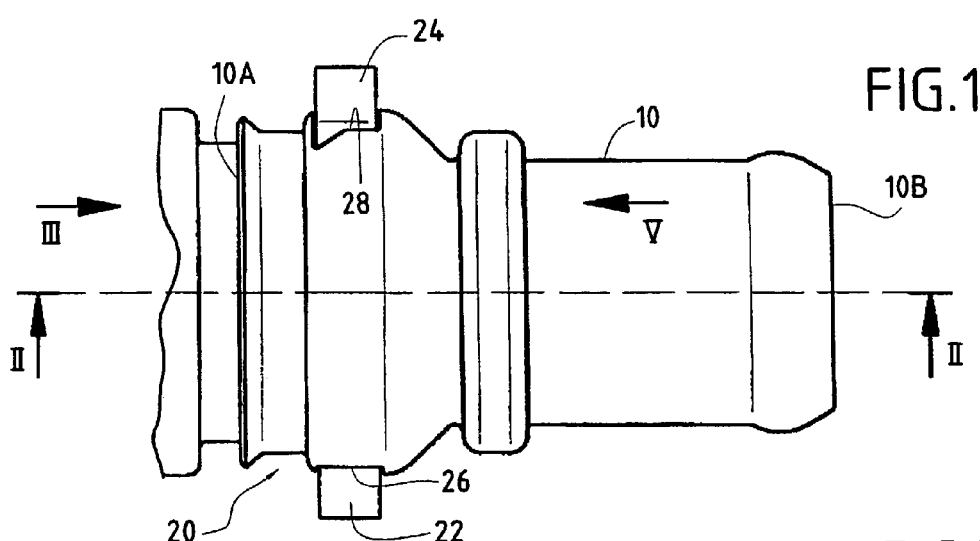
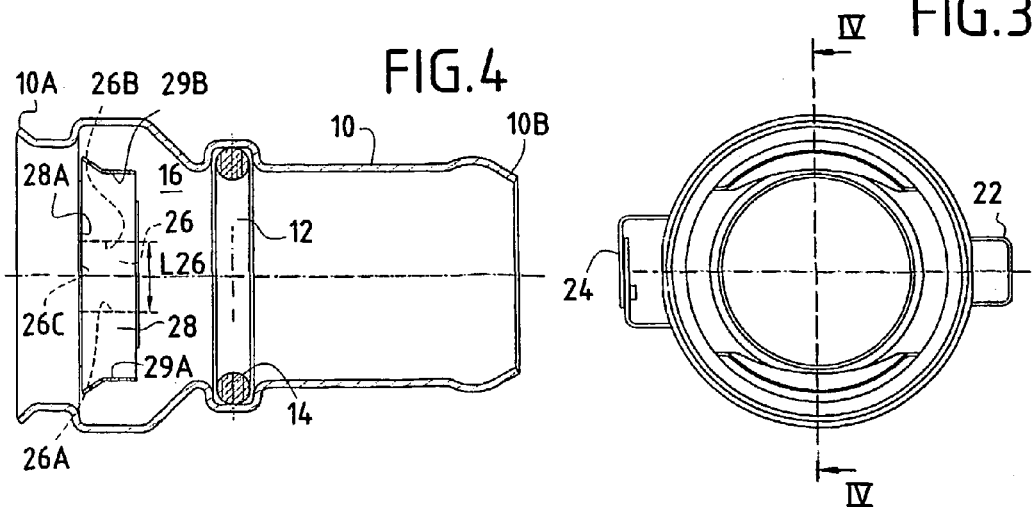

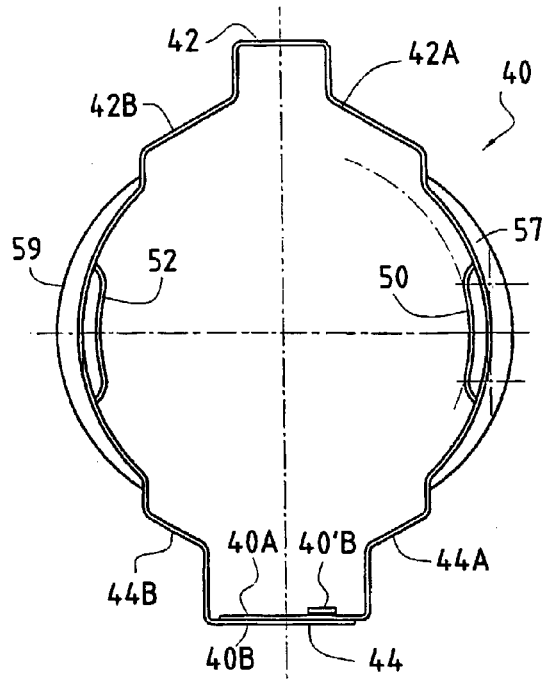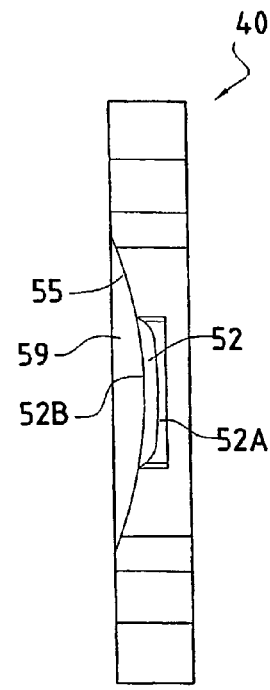
FIG.7  FIG.8
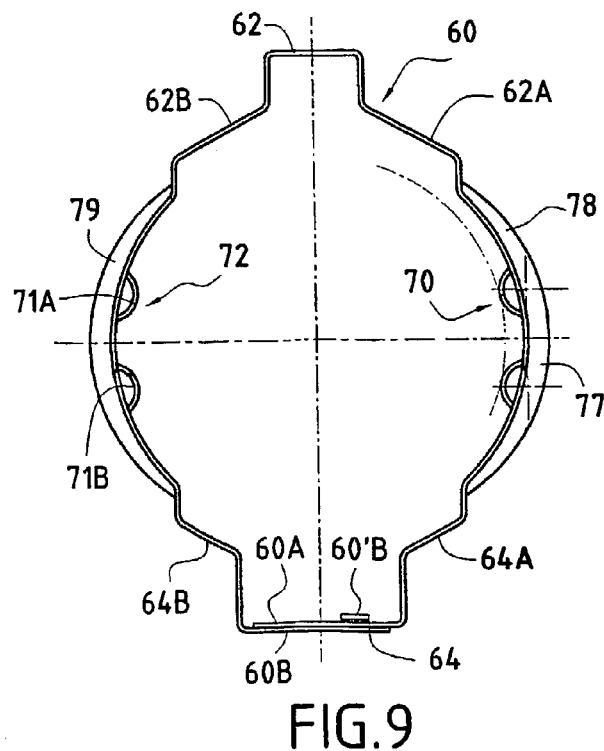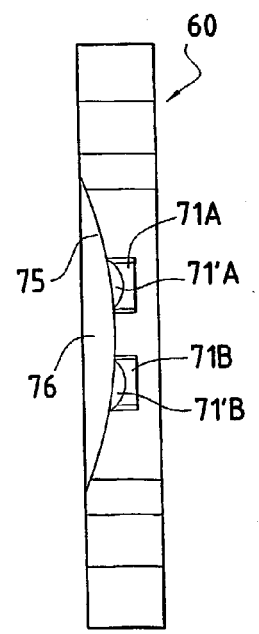
FIG.9  FIG.10

QUICK-CONNECT COUPLING

The present invention relates to a quick-connect coupling suitable for being fitted onto a tube which has a substantially radial catch surface that is remote from its free end, the coupling comprising a body provided with an internal cavity having a first portion suitable for co-operating with sealing means for establishing a leaktight connection with the tube, and a second portion which is situated between the first portion of the cavity and the inlet of the body of the coupling, and in which a locking ring is disposed that is retained by retaining means so as to be prevented from being torn out of the body of the coupling, said ring having at least one locking zone situated in a region in which its radius is at a minimum, and at least one unlocking bridge situated in a region in which its radius is at its maximum, the ring being suitable, starting from a locking configuration in which the locking zone is capable of co-operating with the catch surface of the tube, for being deformed elastically by means of pressure being exerted on the bridge to take up an unlocking configuration, the wall of the internal cavity of the body being provided with at least one slot which opens out into the second portion of the cavity and through which said unlocking bridge protrudes, the locking ring being constituted by a strip of metal deformed plastically so as to have at least said locking zone and said bridge.

Such a quick-connect coupling is known from Document EP-A-0 651 198. That coupling is quite satisfactory, but the Applicant has observed that it could be improved.

Thus, for certain uses, in particular uses in which the tube has a small diameter (approximately in the range 6 millimeters (mm) to 12 mm, e.g. 8 mm), the length of the strip from which the locking ring is formed is small. Document EP-A-0 651 198 proposes, in certain variants, to implement the locking ring in the form of a closed ring whose ends are secured together, e.g. by welding or by interlocking. Such securing means are difficult to use for a small-diameter connection. The surface area necessary to achieve welding of good quality or secure interlocking is relatively large, and uses up a significant portion of the length of the strip from which the locking ring is formed. Over that significant portion, the locking ring is almost completely deprived of its capacity to deform elastically in the radial direction. Therefore, it becomes locally "too rigid", so that the forces required to press the bridge in order to perform unlocking are very large.

An object of the invention is to remedy those drawbacks for a connection of the type mentioned in the introduction, using a ring of the closed type.

The invention achieves this object by means of the fact that the locking ring forms a closed loop and has two ends which overlap, and which are suitable for sliding one over the other while the ring is being elastically deformed.

Thus, the two ends of the ring that overlap guide each other mutually while the ring is being deformed elastically. Since the ends are not fixed together, the capacity of the ring to deform elastically until its locking zone is situated on a diameter making unlocking possible is considerably increased, because the overlap between the two ends of the ring makes a "dead length" available to increase said diameter. In general, regardless of the use in question, the sliding contact of the invention imparts properties to the locking ring that are close to those of a closed ring, e.g. in terms of strength, while also greatly facilitating manipulation thereof for unlocking purposes.

In addition to the above-mentioned guidance, which is performed in the radial direction, the ends of the ring are advantageously held axially by the body of the coupling, in particular by the edges of the slot through which the bridge protrudes, when said ends are provided on the bridge.

The ring advantageously has means for urging its two ends into contact one on the other.

These means may be constituted by plastic deformations, optionally associated with the general elasticity of the ring.

Preferably, the unlocking bridge is formed by said ends of the ring in sliding contact.

It is thus precisely in the zone that is directly pressed during unlocking that the above-mentioned dead length is disposed.

Advantageously, the coupling has means for guiding the relative sliding of the two ends of the locking ring.

These means advantageously comprise a tab and slot or notch system which equips the two ends of the locking ring.

Advantageously, in the region of the unlocking bridge, the strip from which the locking ring is formed is substantially parallel to the axial direction of the coupling, while the locking zone has a plastic deformation forming an inwardly-extending locking edge which, relative to the axial direction of the coupling, slopes towards the axis of the coupling going away from the inlet of the body.

Thus, for the purposes of unlocking, the user exerts pressure on the bridge that forms a surface perpendicular to the direction of the radially applied pressing force. Optimum distribution of the pressing force is thus obtained.

In the locking zone, the ring is deformed so as to slope relative to the axial direction of the coupling. As a result, the locking edge is suitable for co-operating with various forms of catch surface on the tube, be it a shoulder, a bulge, or a groove in which the locking zone is inserted.

The deformation of the unlocking ring imparting the inwardly extending shape to the unlocking edge increases the rigidity of the ring and its capacity to return elastically after being pressed for unlocking purposes. Most of the deformations of the ring that impart its general shape to it (with, in particular, the locking zone and the bridge) are implemented by folds along lines extending axially. The fact that the locking edge is implemented in an inwardly-extending configuration gives a deformation in another direction, which locally increases the strength of the ring. The pressure exerted on the bridge for unlocking purposes modifies the shape of the locking edge little or not at all since said edge is relatively rigid. It acts as a whole, and is merely moved away from the axis of the coupling during unlocking. For locking, it returns to its initial position without being deformed. Its shape thus remains optimum for co-operating with the catch surface, even after the ring has been pressed numerous times.

For example, the ring is formed from a metal strip of stainless steel or of steel that has undergone surface treatment making it resistant to corrosion. The steel has also undergone tempering or some other operation imparting sufficient elasticity to it. The inwardly-extending shape of the locking edge further increases said elasticity, precisely in the region in which it is most necessary.

An advantageous configuration is obtained by means of the fact that the locking ring has two locking zones, which are disposed facing each other on either side of a diametral plane and which are connected to the unlocking bridge which are situated inside the internal cavity of the body, and in that said connecting segments are parallel to the axial direction of the coupling.

By making provision for not only the unlocking bridge but also the connecting segments via which the bridge is connected to the remainder of the ring to be parallel to the axial direction of the coupling, the deformations imparting the inwardly-extending shapes to the locking edges are formed specifically only in those regions in which the edges are situated, thereby increasing the rigidity of the ring locally in said zones, while the connecting segments are easy to move part (thereby moving the locking zones apart) by pressing on the bridge.

Advantageously, the strip forming the locking ring is twisted between the bridge and the locking zone.

By means of this twisting, the portion(s) of the strip on which the locking zones are situated form prismatic or frustoconical surfaces that are very simple to obtain.

Advantageously, the locking ring has at least one fold line extending substantially transversely relative to the axial direction of the coupling, the locking zone being formed by a portion of the ring that is situated behind said line relative to the inlet of the body of the coupling, and which is curved towards the axis of the coupling from said line.

The general direction of said fold line is substantially perpendicular to the direction of the axial folds via which the general shape is imparted to the locking ring. The rigidity and the elasticity of the ring are thus increased along said line.

In which case, advantageously, the locking ring has a first fold line in front of which a guide ramp is formed for fitting the coupling onto the tube, and a second fold line behind which the locking zone is formed.

The two fold lines are advantageously formed on the same angular sectors of the ring.

Between said lines, the ring forms an axial cylinder portion. The two fold lines defining the two sloping (e.g. frustoconical) portions that constitute the guide ramp and the locking zone on either side of said cylinder portion further impart greater rigidity to the locking zone, thereby avoiding it being plastically deformed during the various occasions on which the ring is pressed after it has been put in place in the coupling.

In a variant, the locking edge is formed at the free end of a tongue cut out in the strip and folded over towards the axis of the coupling, said tongue being connected to the strip via its base situated closer to the inlet of the body.

Mere cutting out and folding over in this way constitutes an embodiment that is particularly simple. The line along which the tongue is connected to the strip is disposed substantially transversely relative to the general fold lines of the locking ring, so that, also along this line, the rigidity and the elasticity are increased.

The invention will be well understood and its advantages will appear more clearly on reading the following detailed description of embodiments shown by way of non-limiting example. The description refers to the accompanying drawings, in which:

FIG. 1 is an external view of a connection including a coupling of the invention;

FIG. 2 is a section on line II—II of FIG. 1;

FIG. 3 is an end view looking along arrow III of FIG. 1, showing the coupling of the invention without the tube of the connection;

FIG. 4 is a section on line IV—IV of FIG. 3;

FIGS. 7 and 8 are views analogous to the views of FIGS. 5 and 6, for a variant embodiment;

FIGS. 9 and 10 are views analogous to FIGS. 5 and 6 for another variant;

Figure 5:
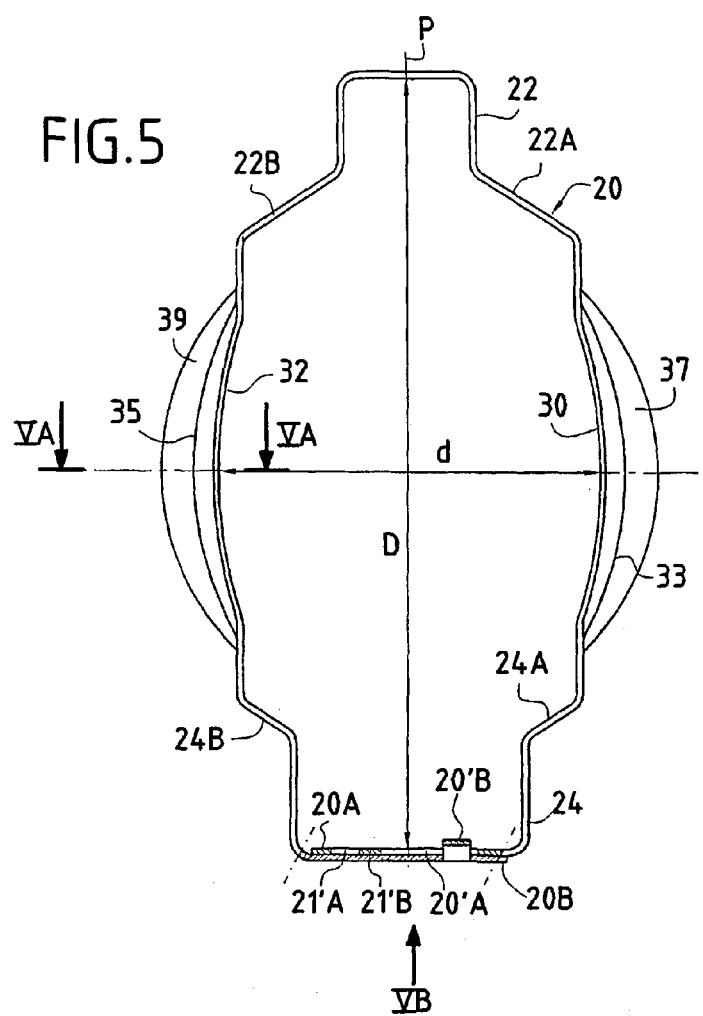
FIG. 5 is a plan view of a locking ring of the invention, looking in a direction corresponding to the direction indicated by arrow V of FIG. 1.

The quick-connect coupling of FIGS. 1 to 4 comprises a body 10 which is substantially circularly symmetrical about an axis A. The body has an internal cavity having a first portion 12 (an annular groove in this example) containing an O-ring 14.

The internal cavity has a second portion 16 which is situated between the first portion and the inlet 10A of the body of the coupling. Said inlet is that one of the ends of the body via which the tube 18 is inserted to achieve the connection.

The forward direction is defined as being the direction which goes towards the inlet 10A of the body of the coupling, while the backward direction goes towards the opposite end 10B.

Figure 6:
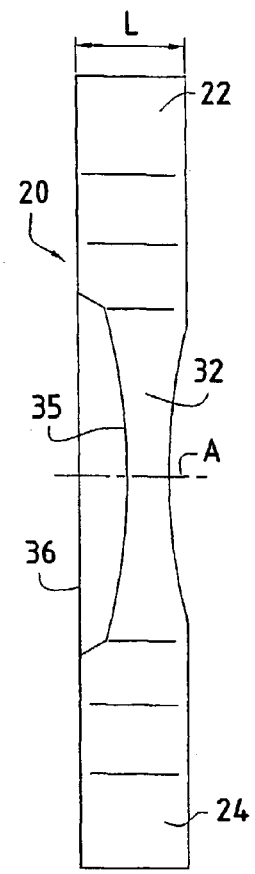
FIG. 6 is a side view of FIG. 5.

A locking ring 20, which can be seen more clearly in FIGS. 5 and 6, is disposed in the second portion 16 of the internal cavity. The ring is formed from a strip of metal looped so that its two ends 20A and 20B come into contact with each other.

For example the strip is made of "spring" steel and its thickness is approximately in the range $2/10$ths of a millimeter to $8/10$ths of a millimeter, and preferably approximately in the range $3/10$ths of a millimeter to $4/10$ths of a millimeter.

The width L of the strip, as measured along the axis A, is, for example, approximately in the range 3 mm to 6 mm and preferably about 5 mm. As can be seen in FIG. 5, the locking ring is substantially oblong in shape, and it has two bridges, respectively 22 and 24, which are disposed facing each other across its large diameter D. The two ends 20A and 20B meet to form the central region of bridge 24.

The wall of the second portion 16 of the cavity of the body of the coupling is provided with two slots, respectively 26 and 28, through which respective ones of the two bridges 22 and 24 protrude.

The small diameter d of the locking ring is substantially perpendicular to its large diameter D. Two locking zones, respectively 30 and 32, are disposed facing each other on either side of the diametral plane P corresponding to the large diameter D, while being spaced apart along the small diameter d. It can be understood that, when pressure is exerted on the bridges 22 and 24 so as to bring them towards the axis A of the coupling, the two locking zones 30 and 32 are moved apart.

As can be seen in FIG. 2, the tube 18 has a catch surface 34, e.g. formed on the back face of a bead 36. When the tube is fitted into the coupling, its cylindrical bearing surface situated between its free end and the bead 36 co-operates with the sealing gasket 14 while the locking zones 30 and 32 of the ring 20 rest against the back face 34, at the base of the bead.

Insofar as the locking ring 20 is retained to prevent it from being torn out of the body of the coupling in the forward direction F (e.g. by the front edges 26C and 28A of the windows 26 and 28), the locking edges prevent the tube from being torn out of the coupling. When, by pressing the bridges, the locking zones are moved far enough apart, they determine between them a diametral distance that is greater than the diameter of the bead 36, thereby making it possible to separate the tube from the coupling.

The ends 20A and 20B of the ring 20 that form the bridge 24 may slide one on the other. They overlap over the web of the U-shape formed by the bridge 24, a portion of which is cut-away in FIG. 5. The end 20B carries a tab 20'B formed by cutting out and folding, said tab passing through a slot 20'A provided in the end 20A. Thus, the ends 20A and 20B can slide on each other parallel to the diameter d while being guided fully relative to each other. The end of the tab 20'B is folded over to prevent the tab from being extracted from the slot 20'A in unwanted manner. Said slot has an enlarged portion 21'A enabling the tab to be inserted into it, and a constriction 21'B forming an end-of-stroke abutment for the tab 20'B.

It is possible to replace the slot 20'A with a notch provided on one side of the portion of the end 20A or 20B that forms the web of the U-shape of the bridge 24, and to provide the other end (20B or 20A) with a tab co-operating with said notch.

It should be noted that it is possible to form the bridge 22 analogously to the bridge 24, with ends in sliding contact.

In the variant shown, the bridge 22 is formed by a continuous portion of the strip constituting the locking ring. In which case, when pressure is exerted on the bridges for unlocking purposes, the bridge 24 widens by the ends of the strip sliding, while the bridge 22 bears the reaction forces and is stressed to a greater extent in active manner once the tab 20'B has come into abutment against the constriction 21'B.

In the region of the bridge 22 or 24, the strip from which the locking ring is formed is parallel to the axis A of the coupling of the connection.

The bridge 22 is connected to the locking zones 30 and 32 by respective connecting segments 22A and 22B. Similarly, the bridge 24 is connected to the locking zones by connecting segments 24A and 24B. The connecting segments are also parallel to the axis A.

Figure 5A:
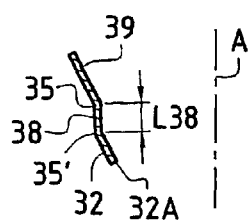
FIG. 5A is a section on line VA—VA of FIG. 5.
Figure 5B:
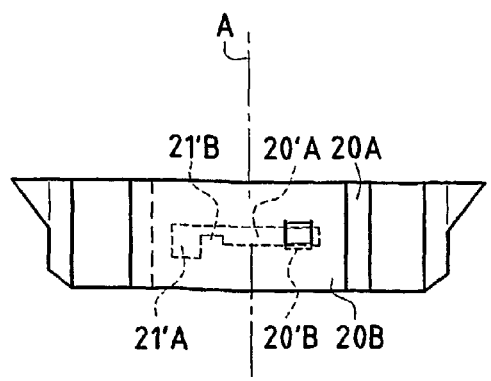
FIG. 5B is a view looking along arrow VB of FIG. 5.

As can be seen more clearly in FIG. 5A, the locking zones are deformed towards the axis A in a direction going away from the inlet of the coupling. These deformations impart an inwardly-extending shape to the locking edges 30A and 32A. The deformations are thus localized and situated in the locking zones, while the bridges and their connecting segments remain parallel to the axis A. As a result, when pressure is exerted on the bridges, their connecting segments tend easily to move apart. Conversely, because of the torsion forces in the regions of the locking zones, which forces are due to the above-mentioned deformations, the locking zones remain relatively rigid. Thus, when the connecting segments connecting the bridges to the locking zones move apart, the two locking edges 30A and 32A move apart while substantially retaining their curvatures.

The locking ring has guide ramps for facilitating fitting the coupling onto the tube. The ramps are designated respectively by the references 37 and 39, and they extend substantially in axial alignment with the locking edges, respectively 30 and 32, and cover substantially the same angular sectors as said locking edges. The ramps flare apart going forwards, thereby facilitating insertion of the tube into the coupling.

FIG. 6 shows that the locking ring 20 has a fold line 35 which extends substantially transversely relative to the axis A. The locking zone 32 is formed by a portion of the ring 20 that lies behind said line 35, while the guide ramp 39 lies in front of it.

On the other side of the locking ring relative to the plane P, a fold line 33 separates the locking zone 30 and the ramp 37.

The ramp 37 and the locking zone 30 slope in the same direction relative to the axis A. The fold line 33 constitutes a point-of-inflection zone between the two sloping portions. The same applies for the fold line 35 between the ramp 39 and the locking zone 32.

More precisely, it can be seen in FIG. 5A that, when considered in cross-section in the region of the locking zones, and starting from the inlet of the coupling, the ring successively has a sloping ramp 39, a first fold line 35, a strip portion in the form of a cylinder portion 38, a second fold line 35', and the locking zone 32.

The width L38 of the cylinder portion 38, as measured along the axis A, is, for example, about 1 mm. By increasing in this way the number of deformations in the direction transverse to the axis A that are formed by the fold lines 35 and 35', the rigidity of the locking ring is further increased locally, as its capacity to return elastically to its locking configuration after it has been urged into the unlocking configuration.

These fold lines and the properties they impart to the ring may be present independently of whether said ring is open, closed, with sliding ends, or with ends fixed together.

FIGS. 7 and 8 show a locking ring 40 that could be used in the coupling of the invention, in place of the ring 20. For reasons of simplicity, the same numerical references are used in these figures as in FIGS. 1 to 6, plus 20.

The general shape of the ring 40 is the same as that of the ring 20. However, the locking zones 50 and 52 are formed differently. They are formed by tongues which are cut out from the strip and which are folded over towards the axis A. The locking edges proper are formed at the free ends of said tongues, such as the free end 52A shown in FIG. 8.

The tongues 50 and 52 are connected to the strip via their bases, such as the base 52B of the tongue 52, shown in FIG. 8. This base faces towards the inlet of the coupling relative to the free end 52A, and it can be seen that it advantageously coincides with the fold line 55 that forms a demarcation between the ramp 59 and that portion of the strip from which the tongue is cut out. The portion may itself be parallel to the axis A of the coupling.

FIGS. 9 and 10, in which the same numerical references as in FIGS. 1 to 6 are used, plus 40, show a locking ring 60 in a variant of FIGS. 7 and 8. In this variant, instead of forming each locking zone by a single tongue, a plurality of notches have been formed in the strip.

For example, as illustrated by the locking zone 72, each locking zone is provided with two notches 71A and 71B which are provided in the strip so as to allow a tongue or a punched-out portion respectively 71'A and 71'B to remain. As can be seen in FIG. 10, the punched-out portions are connected to the strip via their bases, coinciding with the fold line 75 that separates the ramp 79 from the portion of the strip in which the notches are formed. Naturally, depending on the diametral dimensions of the tube and of the coupling, it is possible to choose to form more or fewer notches. The locking edges proper are formed by the free edges of the tongues 71'A and 71'B formed by the notches 71A and 71B.

The tongues 71'A and 71'B, and the tongues 50 and 52 may be formed by projections deformed until the strip is notched to form the free ends of the tongues.

The tongues manufactured by stamping and notching the strip, and therefore with considerable work-hardening, offer the advantage of being extremely resistant to longitudinal forces parallel to the axis of the coupling.

As can be seen in FIGS. 6, 8, and 10, and as illustrated by the lines 35, 55, and 75, the fold lines are advantageously concave when seen looking from the front of the ring, i.e. from the inlet of the coupling, the ends of said lines joining up with the front edge of said ring.

Figure 11:
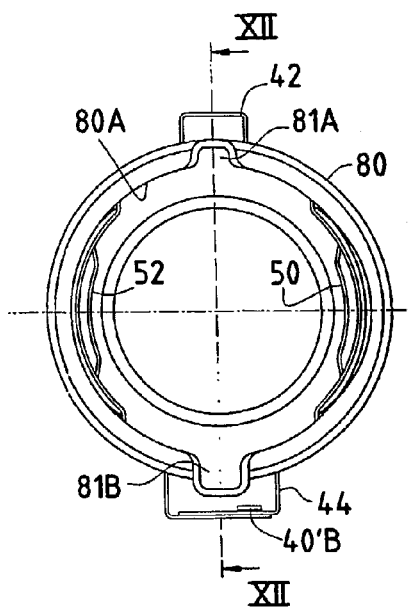
FIG. 11 is an end view analogous to the view of FIG. 3, for a variant embodiment.
Figure 12:
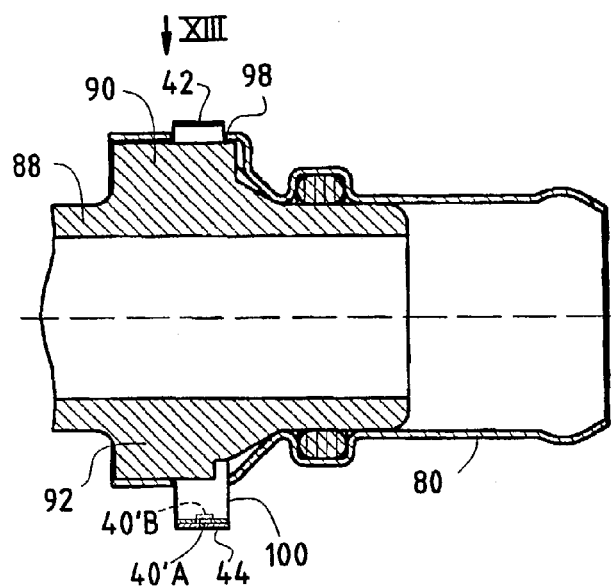
FIG. 12 is a section on line XII—XII of FIG. 11.

The quick-connect coupling of FIGS. 11 and 12 is equipped with the locking ring 40 described above with reference to FIGS. 7 and 8.

Figure 13:
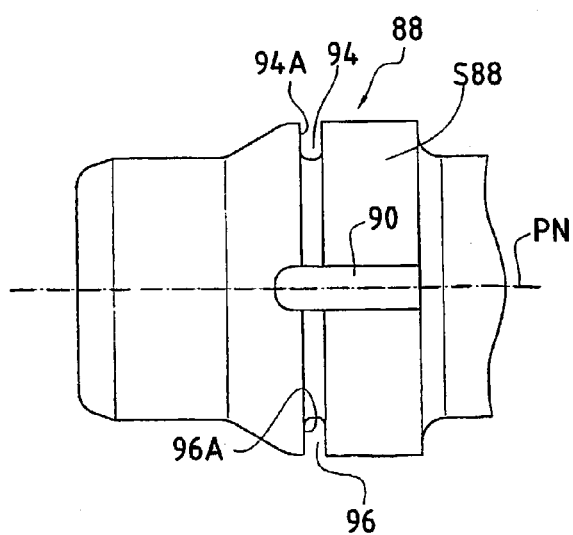
FIG. 13 shows the connection tube of FIG. 12 looking along arrow XIII of FIG. 12.

Like the body 10 of the coupling of FIGS. 1 to 4, the body 80 of said coupling is advantageously made in one piece, e.g. of a metal such as stainless steel, aluminum, or coated steel, or else of a plastics material. The coupling is adapted to co-operate with a specially-shaped tube 88, which must be wedged angularly relative to it. As can be seen more clearly in FIGS. 12 and 13, the tube 18 has two angular wedging axial ribs, respectively 90 and 92, which are diametrically opposite each other. They project relative to the cylindrical surface S88 of said tube. To fasten to the coupling, the tube has a circular groove or, more precisely, two groove portions, respectively 94 and 96, each of which extends over about one half of a circle, between the two ribs 90 and 92, on either side of the diametral plane PN in which the ribs are aligned. The catch surfaces proper are formed by the radial faces 94A and 96A of said grooves, which faces face towards the free end of the tube.

The tongues 50 and 52, which are folded over towards the axis A to form the locking edges, penetrate into the grooves 94 and 96 to co-operate with the radial faces 94A and 96A. Thus, in addition to the above-mentioned advantages in terms of rigidity and of elasticity, the inwardly-extending shape of the locking edges makes it possible to adapt the connection of the invention to match tubes of various shapes.

The two bridges 42 and 44 of the locking ring 40 are adapted to match respective ones of the ribs 90 and 92 on the tube.

The inlet 80A of the body of the coupling has two diametrically opposite setbacks 81A and 81B, between which its diametral dimensions are at their maximum, so as to enable the ribs 90 and 92 of the tube to be inserted between them. Said setbacks extend axially substantially to the slots 98 and 100 in the body of the coupling, which slots pass respective ones of the bridges 42 and 44 of the locking ring. It should be noted that, in place of the setbacks 81A and 81B, it is possible to equip the body of the coupling with axial slots connecting the inlet of said coupling to the slots 98 and 100.

In the above-described figures, the bridge 24, 44, or 64 forms a U-shape whose web is substantially plane, parallel to a diametral plane of the locking ring. Said web may be slightly curved, so as to be concave facing the center of the ring, for the purpose of naturally urging the flanges of the U-shape towards each other during sliding, and of maintaining the symmetry of the ring about the diametral plane parallel to said flanges.

Figure 14:
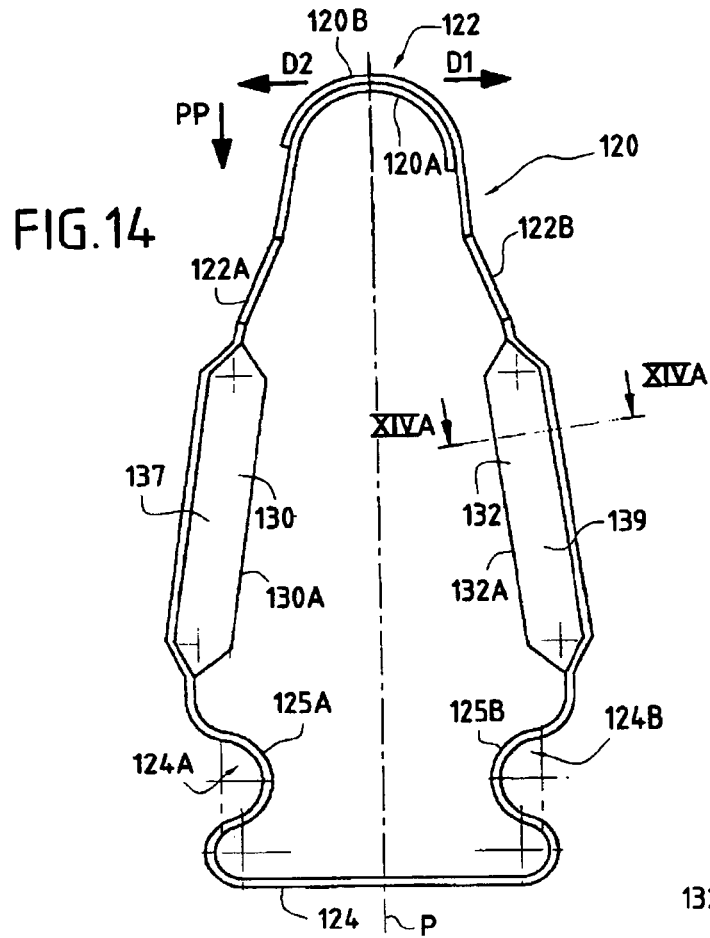
FIG. 14 is a plan view looking in a direction corresponding to the direction of FIG. 3, of a locking member in a variant embodiment.

FIG. 14 shows a locking ring 120 that has one unlocking bridge 122 and two locking zones, respectively 130 and 132, disposed facing each other, on either side of a diametral plane P about which the ring is symmetrical.

Like the locking rings shown by way of example in the other variants, the ring 120 is looped back on itself Its two ends 120A and 120B overlap without being fixed together. Thus, when the ring is deformed elastically, its two ends slide one against the other. In particular, when pressure is exerted on the unlocking bridge 122 in the direction indicated by the arrow PP, the two ends 120A and 120B sliding against each other facilitates moving the locking edges 130 and 132 apart. This facilitates elastically deforming the ring, which is necessary to achieve unlocking.

The two ends 120A and 120B are shaped so as to be urged back into sliding contact with each other. In particular, as can be seen in FIG. 14, they are concave in shape when they are seen from inside the ring. As a result, they constitute return surfaces for each other, which surfaces naturally return the ring to its locking configuration after unlocking has taken place by pressing on the bridge in the direction PP. In this example, the ends 120A and 120B form the bridge 124. The curvature of the concave portions of the ends 120A and 120B is substantially constant.

When pressure is exerted in the direction PP, the two segments of the strip that are situated on either side of the diametral plane P tend to move apart. In other words, the end 120A moves with the locking zone 130 in the direction D1, while the end 120B moves with the edge 132 in the opposite direction D2. However, the outside face of the end 120B co-operates with the inside face of the end 120A, and, insofar as the surface that said inside face determines has a component directed in the direction D1, said co-operation naturally returns the end 120B in the direction D1, as soon as the pressure on the bridge in the direction PP ceases.

The ends 120A and 120B, which are in sliding contact, are angularly positioned parallel to the axis A of the coupling. Similarly, the connecting segments 122A and 122B via which the bridge is connected to respective ones of the locking zones 130 and 132 are angularly positioned parallel to the axis A.

Figure 14A:
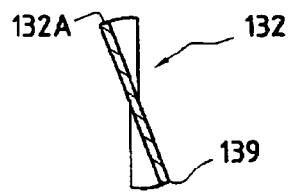
FIG. 14A is a section on line XIVA—XIVA of FIG. 14.

Between the connecting segments and the locking segments, the strip is twisted, as can be understood by considering FIG. 14A. It thus has two sloping portions, in which it slopes over its entire width relative to the axis A. The front faces of said sloping portions, which faces slope outwards relative to the axial direction which is the direction of the connecting segments, form guide ramps 137 and 139 flaring apart forwards for the purpose of inserting the tube into the coupling. The back edges of said sloping portions form the locking edges 130A and 132A proper.

Opposite from the bridge 122, the ring is provided with another bridge 124. This bridge is connected to the locking edges 130 and 132 by connecting segments, respectively 124A and 124B. The connecting segments are parallel to the axis A of the connection coupling.

As can be seen in FIG. 14, each of them has an undulation, respectively 125A and 125B, whose concave face faces towards the outside of the ring. These undulations make it possible to wedge said ring relative to the body of the coupling 110 shown in FIG. 15.

The body 110 is provided with an internal cavity, a first portion 112 of which is suitable for co-operating with sealing means for establishing a leaktight connection between the body of the coupling and the outside periphery of a tube fitted into said coupling. For example, said first portion is in the shape of an annular groove containing an O-ring 114.

The locking ring 120 serves to be disposed in the second portion 116 of the cavity, which is situated between the first portion 114 and the inlet 110A of the body of the coupling.

In the region of said second portion 116, the axial wall of the body of the coupling is provided with two diametrically opposite slots, respectively designated by the references 126 and 128, respectively suitable for co-operating with the bridges 122 and 124 of the ring.

Figure 15:
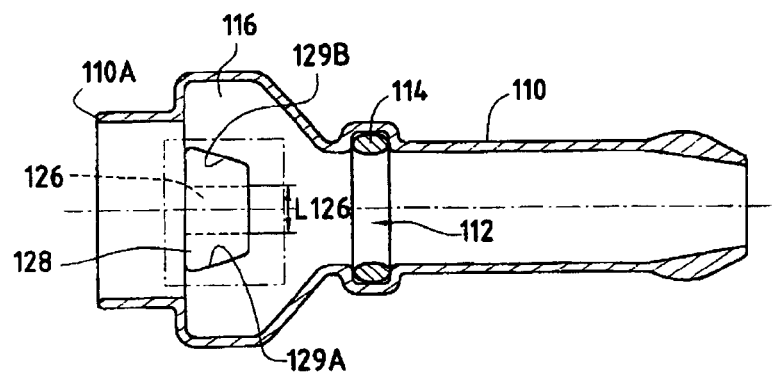
FIG. 15 is a longitudinal section view of the body of an coupling suitable for said variant.

FIG. 15 is an axial section on which normally only the slot 128 is visible, but, to make the explanation clearer, the position of the slot 126 is indicated by dashed lines.

The locking ring 120 is suitable for being disposed in the body of the coupling by being engaged radially through the slot 128. It can be seen that the slot 126 has a length L126, as measured in the direction transverse to the axis A of the body of the coupling, that is less than the length of the slot 128, as measured in the same direction.

The slot 126 is too small to enable the locking ring to be inserted into the body of the coupling through it. The ring must therefore be inserted through the slot 128, until the bridge 122 protrudes through the slot 126.

The above-mentioned undulations 125A and 125B serve to co-operate with the sides 129A and 129B of the slot 128 so as to determine the maximum extent to which the locking ring 120 can penetrate into the body of the coupling. It can be seen that said sides 129A and 129B slope so as to pass the sloping portions of the locking ring, on which sloping portions the locking zones are formed.

To enable the locking ring to be inserted radially in the above-mentioned manner, the locking zones 130 and 132 are moved elastically closer together, since the spacing between the edges 129A and 129B of the slot 128 corresponds substantially to the spacing between the troughs of the undulations 125A and 125B.

Similarly, in the variant shown in FIGS. 1 to 4, the two slots 26 and 28 through which the bridges 22 and 24 respectively protrude are different from each other.

Although the slot 26 is not normally visible in the section of FIG. 4, its position is indicated in dashed lines in FIG. 4. It can be seen that it has a length L26, measured transversely to the axis A, that is less than the length of the slot 28. The bridge 22 (like the bridge 42 or 62) has a length, measured in the same direction, that is less than the length of the bridge 24 (or of the bridge 44 or 64).

The locking ring 20, 40, or 60 can be inserted into the body of the coupling of FIG. 4 by being moved radially through the slot 28 which is referred to as the "insertion slot". For this purpose, the two locking zones 30 and 32, 50 and 52, or 70 and 72 are moved towards each other so as to reduce the minimum diameter of the ring elastically. The ring is inserted via its narrower bridge 22, 42, 62 until said bridge protrudes through the slot 26, until the connecting segments 22A and 22B, 42A and 42B, or 62A and 62B rest against the edges 26A and 26B of the slot 26, and until the connecting segments 24A & 24B, 44A & 44B, or 64A & 64B co-operate with the sides 29A and 29B of the slot 28 to retain the locking ring inside the body of the coupling.

It can be seen in FIG. 4 that the insertion slot 28 has a wide front portion so as to enable the guide ramps 34 & 36, 54 & 56, or 74 & 76 of the locking ring to pass into the body, and a narrow portion that co-operates with the locking ring to wedge it angularly. In other words, the slot 28 flares forwards, while the back portions of its sides 29A and 29B are parallel to the axis A. Uprights of the bridge 64 co-operate with the rectilinear back portions to wedge the ring angularly.

Regardless of the variant chosen, it can be observed in the drawings that the locking rings 20, 40, 60, or 120 are disposed in a radial "slice" of thickness which is substantially equal to the width of the strip from which they are formed, in the region(s) of the bridge(s).

As indicated above, the body of the coupling may be made of metal or of a plastics material. The sealing means may be disposed in a groove or they may be held in place by a securing ring, itself fixed to the body, e.g. by snap-fastening. Regardless of whether or not it is made of plastic, the body can have wedging shapes for preventing the tube from rotating, such as 81A and 81B shown in FIG. 11.

We claim:

1. A quick-connect coupling suitable for being fitted onto a tube which has a substantially radial catch surface that is remote from its free end, the coupling comprising:

a body provided with an internal cavity having a first portion suitable for co-operating with sealing means for establishing a leaktight connection with the tube, and a second portion which is situated between the first portion of the cavity and an inlet of the body of the coupling, and in the second portion a locking ring is disposed that is retained by retaining means so as to be prevented from being torn out of the body of the coupling;

said ring having at least one locking zone situated in a region in which its radius is at a minimum, and at least one unlocking bridge situated in a region in which its radius is at its maximum, the ring being suitable, starting from a locking configuration in which the locking zone is capable of co-operating with the catch surface of the tube, for being deformed elastically by means of pressure being exerted on the bridge to take up an unlocking configuration;

the wall of the internal cavity of the body being provided with at least one slot which opens out into the second portion of the cavity and through which said unlocking bridge protrudes, the locking ring being constituted by a strip of metal deformed plastically so as to have at least said locking zone and said bridge;

the locking ring forming a closed loop and having two ends which slidingly overlap, wherein the locking ring has at least one fold line extending substantially transversely relative to an axial direction of the coupling, the locking zone being formed by a portion of the ring that is situated on an opposite side of said at least one fold line with respect to the inlet side of the body of the coupling, and which is deflected radially inwardly so as to be curved towards the axis of the coupling from said line.

2. The quick-connect coupling according to claim 1, wherein the locking ring has at least one guide ramp for fitting the coupling onto the tube, said guide ramp being formed by a portion of said ring that is situated on the same side of the fold line as the inlet side of the body of the coupling and that is curved radially away from the axis of the coupling in a direction along the axis of the coupling towards the inlet of the body.

3. A quick-connect coupling suitable for being fitted onto a tube which has a substantially radial catch surface that is remote from its free end, the coupling comprising:

a body provided with an internal cavity having a first portion suitable for co-operating with sealing means for establishing a leaktight connection with the tube, and a second portion which is situated between the first portion of the cavity and an inlet of the body of the coupling, and in the second portion a locking ring is disposed that is retained by retaining means so as to be prevented from being torn out of the body of the coupling;

said ring having at least one locking zone situated in a region in which its radius is at a minimum, and at least one unlocking bridge situated in a region in which its radius is at its maximum, the ring being suitable, starting from a locking configuration in which the looking zone is capable of co-operating with the catch surface of the tube, for being deformed elastically by means of pressure being exerted on the bridge to take up an unlocking configuration;

the wall of the internal cavity of the body being provided with at least one slot which opens out into the second portion of the cavity and through which said unlocking bridge protrudes, the locking ring being constituted by a strip of metal deformed plastically so as to have at least said locking zone and said bridge; and the locking ring forming a closed loop and having two ends which overlap, and which are suitable for sliding one over the other while the ring is being elastically deformed, wherein the locking ring comprises at least one tongue cut out in the strip and folded over towards an axis in the coupling for forming the locking zone, said tongue being connected to the strip via its base situated close to the inlet of the body.

4. A quick-connect coupling suitable for being filled onto a tube which has a substantially radial catch surface that is remote from its free end, the coupling comprising:

a body provided with an internal cavity having a first portion suitable for co-operating with sealing means for establishing a leektight connection with the tube, and a second portion which is situated between the first portion of the cavity and an inlet of the body of the coupling, and in the second portion a locking ring is disposed that is retained by retaining means so as to be prevented from being torn out of the body of the coupling;

said ring having at least one locking zone situated in a region in which its radius is at a minimum, and at least one unlocking bridge situated in a region in which its radius is at its maximum, the ring being suitable, starting from a locking configuration in which the locking zone is capable of co-operating with the catch surface of the tube, for being deformed elastically by means of pressure being exerted on the bridge the take up an unlocking configuration;

the wall of the internal cavity of the body being provided with at least one slot which opens out into the second portion of the cavity and through which said unlocking bridge protrudes, the locking ring being constituted by a strip of metal deformed plastically so as to have at least said looking zone and said bridge; and the locking ring forming a closed loop and having two ends which overlap, and which are suitable for sliding one over the other while the ring is being elastically deformed, wherein the locking ring comprises a plurality of tongues formed by notches cut out in the strip, said tongues being connected to the inlet of the body, these tongues having free edges forming locking edges in the locking zone.

5. A quick-connect coupling suitable for being fitted onto a tube which has a substantially radial catch surface that is remote from its tree end, the coupling comprising:

a body provided with an internal cavity having a first portion suitable for co-operating with sealing means for establishing a leaktight connection with the tube, and a second portion which is situated between the first portion of the cavity and an inlet of the body of the coupling, and in the second portion a locking ring is disposed that is retained by retaining means so as to be prevented from being torn out of the body of the coupling;

said ring having at least one locking zone situated in a region in which its radius is at a minimum, and at least one unlocking bridge situated in a region in which its radius is at its maximum, the ring being suitable, starting from a locking configuration in which the locking zone is capable of co-operating with the catch surface of the tube, for being deformed elastically by means of pressure being exerted on the bridge to take up an unlocking configuration;

the wall of the internal cavity of the body being provided with at least one slot which opens out into the second portion of the cavity and through which said unlocking bridge protrudes, the locking ring being constituted by a strip of metal deformed plastically so as to have at least said locking zone and said bridge;

the locking zone being formed on a tongue cut out in the strip and folded over towards an axis of the coupling, said tongue being connected to the strip via its base situated close to the inlet of the body.

6. The quick-connect coupling according to claim 5, wherein the body of the coupling is formed in one piece.

* * * * *